(12) United States Patent
Suzuki et al.

(10) Patent No.: US 7,360,955 B2
(45) Date of Patent: Apr. 22, 2008

(54) BOARD-MOUNTED OPTICAL CONNECTOR (75) Inventors: Shuji Suzuki, Tokyo (JP); Masao Kinoshita, Tokyo (JP)

(73) Assignees: Hirose Electric Co., Ltd., Tokyo (JP); NEC Corporation, Tokyo (JP)

( * ) Notice: Subject to any disclaimer, the term of this patent is extended or adjusted under 35 U.S.C. 154(b) by 70 days.

(21) Appl. No.: 11/358,444

(22) Filed: Feb. 21, 2006

(65) Prior Publication Data

US 2006/0198584 A1 Sep. 7, 2006

(30) Foreign Application Priority Data

Mar. 3, 2005 (JP) .............................. 2005-059196

(51) Int. Cl.
*G02B 6/36* (2006.01)
(52) U.S. Cl. ............................ 385/92; 385/53; 385/88; 385/93; 385/94
(58) Field of Classification Search .................. 385/53, 385/88, 92–94
See application file for complete search history.

(56) References Cited

U.S. PATENT DOCUMENTS

2003/0108303 A1*  6/2003  Asada ........................ 385/86

FOREIGN PATENT DOCUMENTS

JP    2003-121697    4/2003

* cited by examiner

*Primary Examiner*—Frank G. Font
*Assistant Examiner*—Jerry Martin Blevins
(74) *Attorney, Agent, or Firm*—Cohen Pontani Lieberman & Pavane LLP (57) ABSTRACT

A board-mounted optical connector is provided which enables high-density wiring of optical fibers on a board. The board-mounted optical connector is a board-mounted optical connector having a housing comprising: a first housing component, and a second housing component. The first housing component has a housing space accessible through an opening formed in at least a portion of a side wall and houses portions of optical fiber members that are partially laid along the top surface of a board and are bent at nearly right angle to the board together with an optical component connected to the optical fiber members in the housing space through the opening. The second housing component is attached to the first housing component and can close the opening of the housing space with the portions of the optical fiber members and the optical component connected to the optical fiber members housed in the first housing component.

26 Claims, 12 Drawing Sheets

BOARD-MOUNTED OPTICAL CONNECTOR

BACKGROUND OF THE INVENTION (i) Field of the Invention

This invention relates to a board-mounted optical connector of a type that is mounted on a board such as a back plane and used.

(ii) Description of the Related Art

In recent years, optical signal transmission has been conducted as a measure for the limit of the transmission rate of electric wires due to an increase in information communication speed and the occurrence of electric noise due to a decrease in the size of electronic equipment. In devices such as a router which handle enormous signal processing, a number of wires concentrate and cross one another on a back plane board. For optical wiring, a high-density and compact back plane board has not been achieved.

Figure 18:
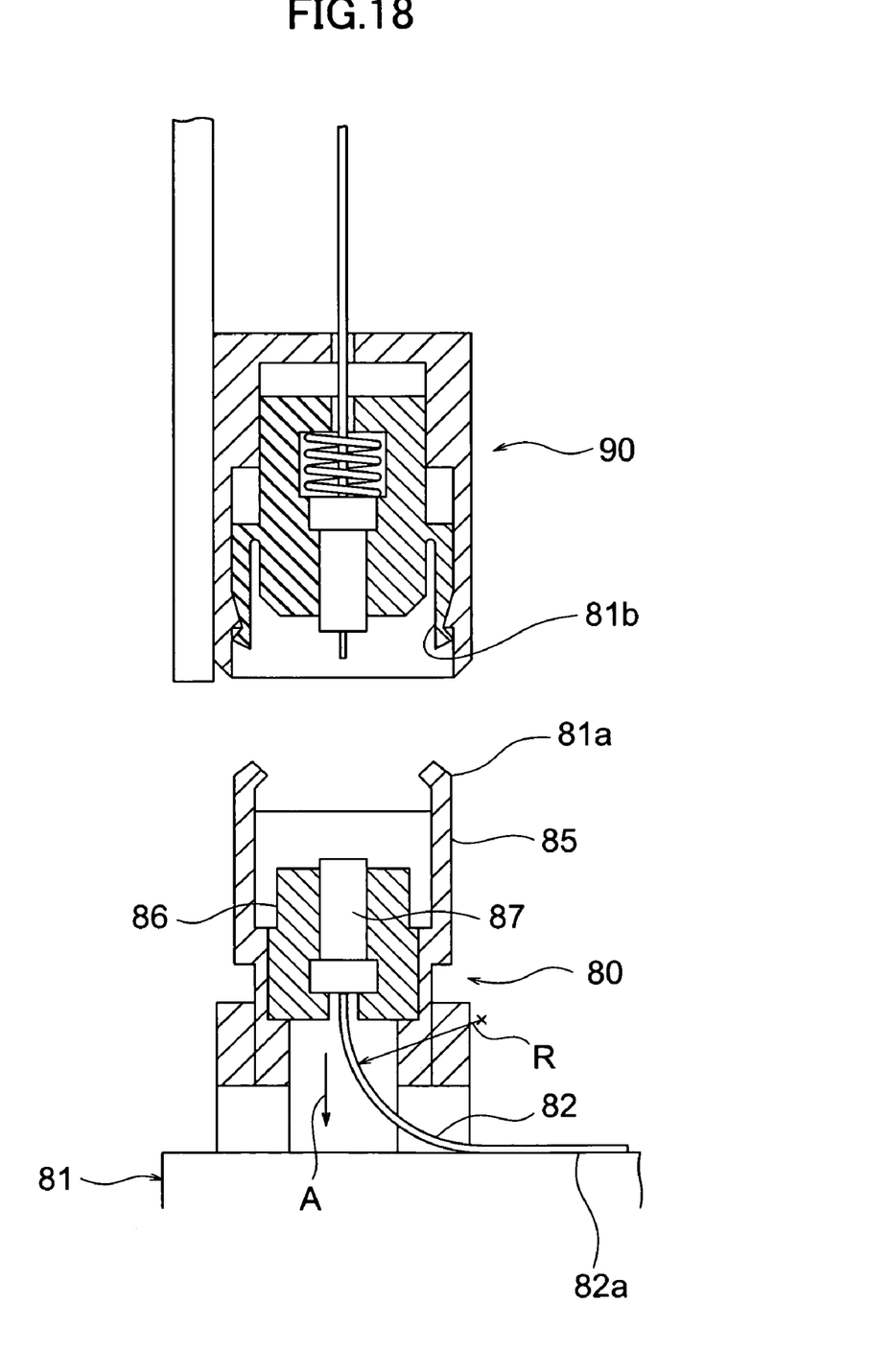
FIG. 18 is a cross-sectional view of an optical connector of the prior art.

An example of the prior art that has intended to achieve higher density optical wiring is Japanese Patent Laid-Open Publication No. 121697/2003. FIG. 18 shows across section of a device according to the prior art. This optical connector 80 can be fitted to a corresponding optical connector 90. To facilitate the fitting, the optical connector 80 has guide portions 81a for guiding the corresponding optical connector 90, and the corresponding optical connector 90 has guide portions 81b that correspond to the guide portions 81a. When actually used, the optical connector 80 is placed upright on a back plane board 81 as shown in FIG. 18. In the optical connector 80 placed on the board 81, an optical fiber 82 which is partially laid on the top surface of the back plane board 81 and is bent near the optical connector 80 at nearly right angle R to the back plane board 81 is housed, thereby making it possible to mount the optical connector even with small package board pitches. According to such a constitution, higher density wiring can be achieved with the optical fiber 82, and a more compact optical back plane can be attained.

Although not necessarily clear from the drawing, the optical connector 80 is assembled in the following manner. That is, firstly, the optical fiber 82 with a ferrule 87 and a ferrule holder 86 attached to its front end is passed through a cylindrical housing 85 for the optical connector in advance, an optical fiber 82a is fixed at a predetermined position on the back plane 81, the optical fiber 82 which has been passed through the cylindrical housing 85 in advance is then pulled in the direction indicated by the arrow A in FIG. 18 so as to press-fit and fix the ferrule holder 86 and the ferrule 87 in the cylindrical interior of the cylindrical housing 85, and finally the cylindrical housing 85 is disposed at a predetermined position on the back plane 81.

However, when such an assembling method is used, the optical fiber 82 must be provided with an extra length since the optical fiber 82 is pulled later, and there is a high possibility that the optical fiber 82 may be broken while the cylindrical housing 85 and other optical connector components are fixed to the optical fiber 82 and they as a whole are then mounted at a predetermined position on the back plane 81. Further, for example, a fiber board which bundles a plurality of optical fibers 82 or such optical fibers has no rigidity around a portion where the optical fibers are taken out. Further, a number of connectors are attached to a single fiber board, thereby making the mounting process difficult. In addition, in high-density packaging which requires small package board pitches, when connectors are mounted on a back plane with the connectors connected to a fiber board, adjacent connectors interfere with each other, thereby making it difficult to mount the optical connectors on the back plane.

Patent Literature 1

Japanese Patent Laid-Open Publication No. 121697/2003

The present invention has been conceived to solve the above problems of the prior art. An object of the present invention is to provide an optical connector which enables high-density wiring of optical fibers without requiring the optical fibers to have an extra length and can be assembled easily by assembling the connector on a board, i.e. by carrying out positioning of optical fibers and a fiber board on a back plane and positioning of an optical connector housing on the back plane separately and then attaching the optical fibers and the fiber board to the optical connector housing.

SUMMARY OF THE INVENTION

A board-mounted optical connector of the present invention has a housing comprising:
a first housing component, and
a second housing component, wherein the first housing component has a housing space accessible through an opening formed in at least a portion of a side wall and houses portions of optical fiber members that are partially laid along the top surface of a board and are bent at nearly right angle to the board together with an optical component connected to the optical fiber members in the housing space through the opening, and the second housing component is attached to the first housing component and can close the opening of the housing space with the portions of the optical fiber members and the optical component connected to the optical fiber members housed in the first housing component.

In the above optical connector, the first housing component and the second housing component each may be integrally molded and have portions for guiding or locking a corresponding connector to be fitted to the optical connector.

Further, a board-mounted optical connector of the present invention has a housing comprising: holding components, a first housing component, and
a second housing component, wherein the holding components hold a plurality of optical components each connected to one ends of optical fiber members, the first housing component has a housing space accessible through an opening formed in a side wall and houses portions of the optical fiber members that are partially laid along the top surface of a board and are bent at nearly right angle to the board together with the holding components connected to the optical fiber members in the housing space through the opening, and the second housing component is attached to the first housing component from above the board and can close the opening of the housing space with the portions of the optical fiber members and the optical components connected to the optical fiber members housed in the first housing component.

In the above optical connector, an auxiliary housing having portions for guiding or locking a corresponding connector to be fitted to the above optical connector may be attached to the holding components.

In the above optical connector, the second housing component may be fixed to the first housing component by press fitting.

In the above optical connector, the first housing component may have press-fit terminals on the fixing surface which contacts the board.

In the above optical connector, in the first housing component, an edge of the fixing surface which contacts the board may be hollowed on the side where the opening is formed.

The present invention enables mounting of an optical connector on a back plane along with fixation of optical fibers or a fire board to the back plane and can address an increase in the density of optical wiring and a decrease in board pitches.

DETAILED DESCRIPTION OF THE PREFERRED EMBODIMENTS

Hereinafter, the present invention will be further described with reference to the drawings.

Figure 1:
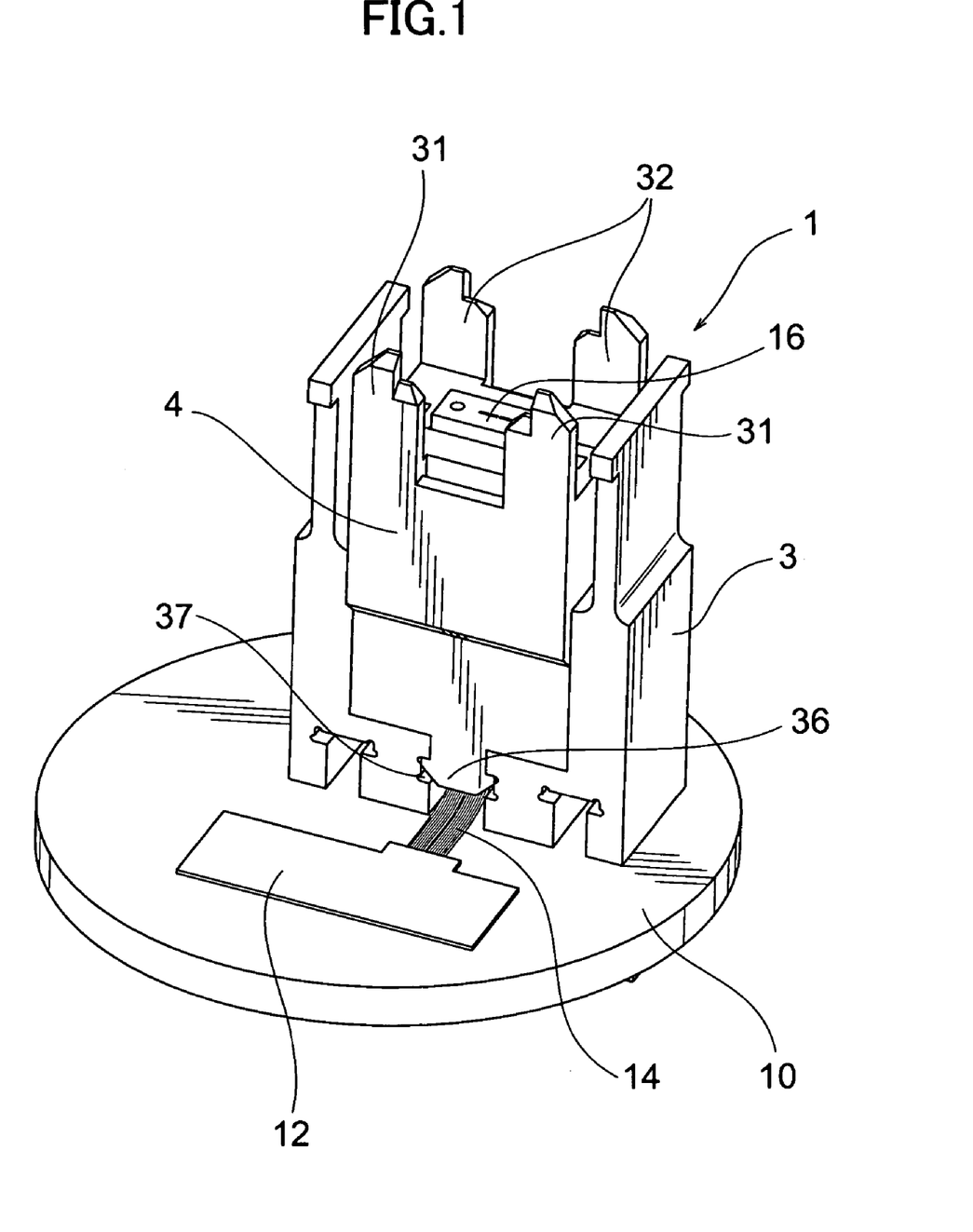
FIG. 1 is a perspective view of the final assembled form of a board-mounted optical connector according to a first embodiment of the present invention.
Figure 2:
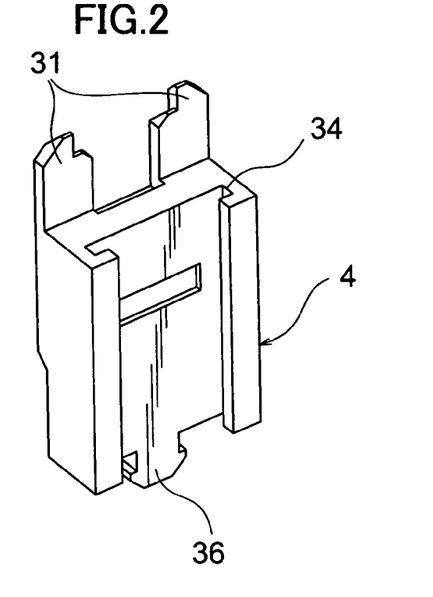
FIG. 2 is a perspective view of a second housing component of an optical connector housing.
Figure 3:
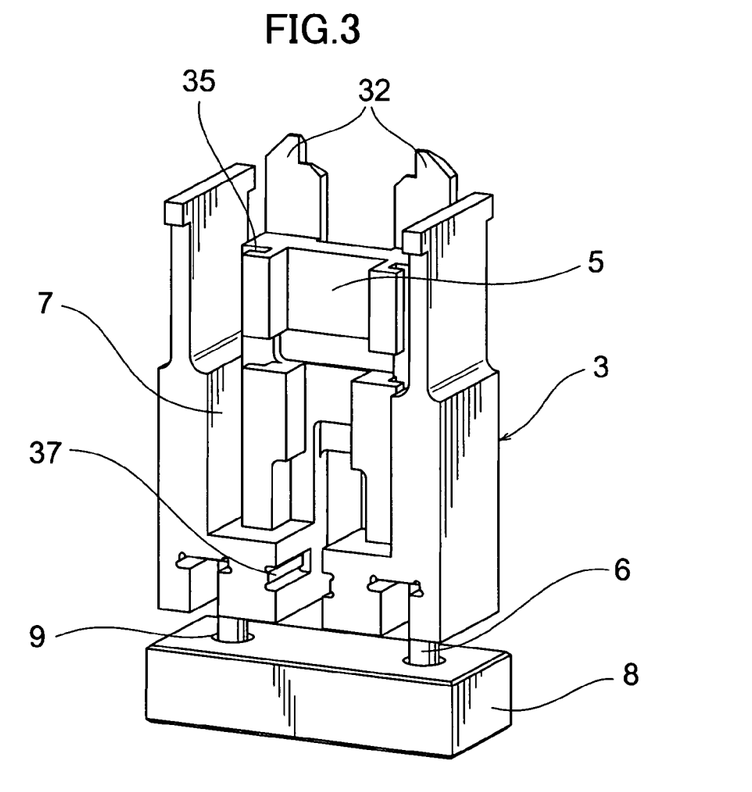
FIG. 3 is a perspective view of a first housing component of the optical connector housing.
Figure 4:
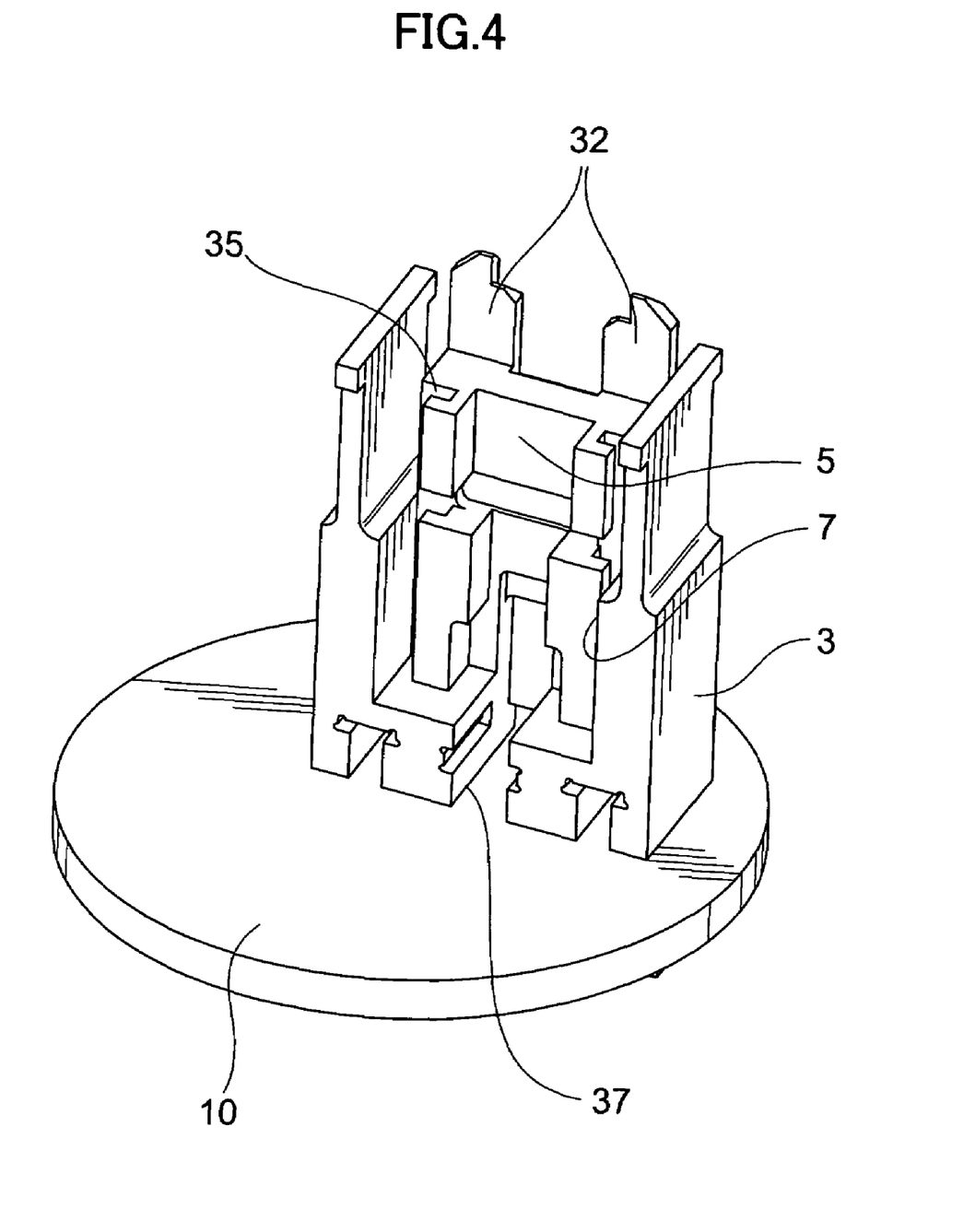
FIG. 4 is a perspective view of the first housing component mounted on a back plane.
Figure 5:
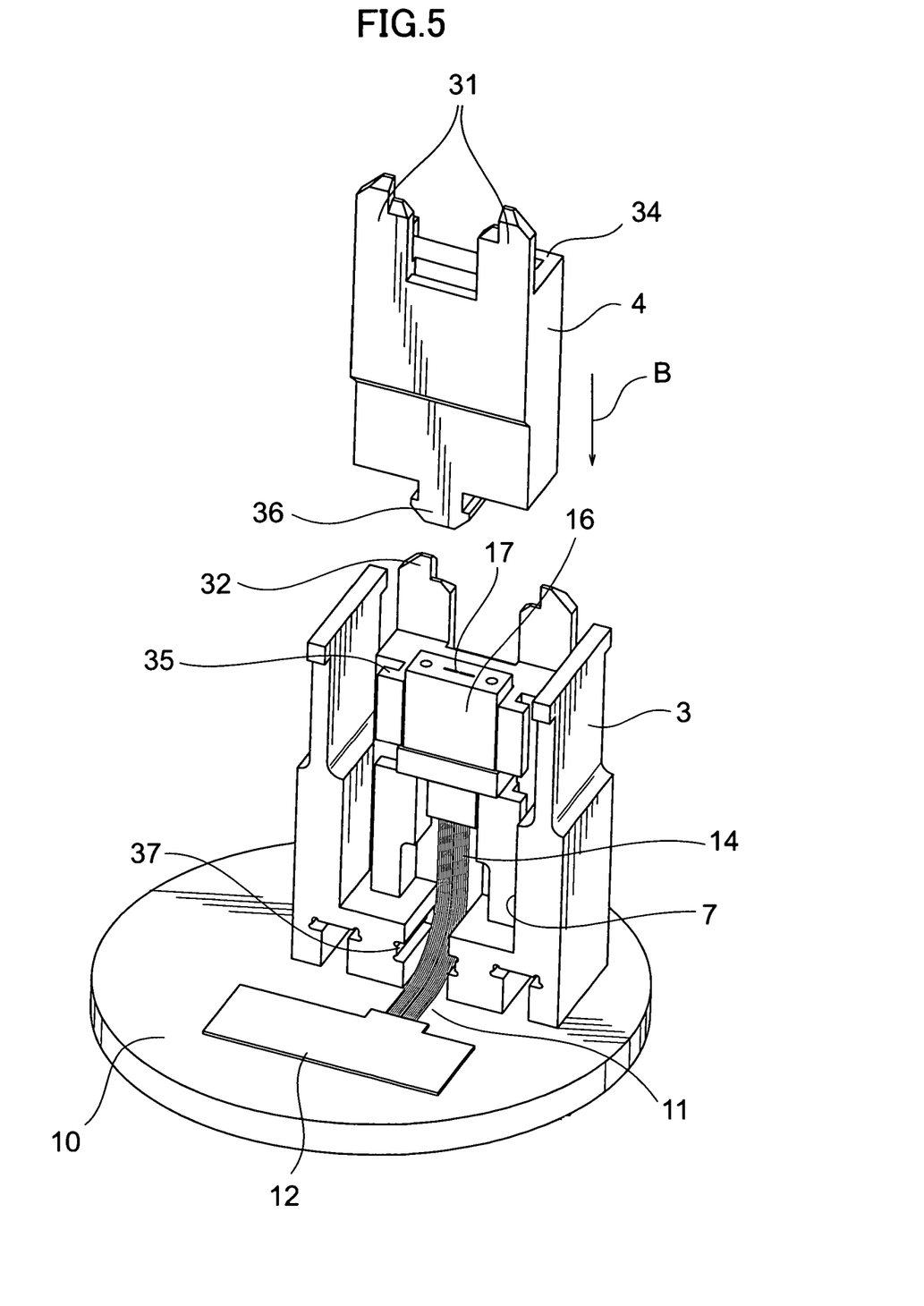
FIG. 5 is a perspective view of the optical connector housing after mounted on the back plane and incorporating an optical ferrule.

FIG. 1 is a perspective view of the final assembled form of a board-mounted optical connector 1 according to a first embodiment of the present invention, more specifically, a perspective view of the optical connector after mounted on a back plane 10 and after incorporating an optical ferrule 16. Meanwhile, FIGS. 2 and 3 are perspective views of main components of an optical connector housing before mounted on the back plane 10 and before incorporating the optical ferrule 16. Further, FIGS. 4 and 5 are diagrams illustrating steps of assembling the main components shown in FIG. 3 into the final form shown in FIG. 1.

The housing is formed by two components separable from each other, i.e. a first housing component 3 and a second housing component 4. More specifically, the second housing component 4 (first housing component 3) is formed separably from the first housing component 3 (second housing component 4) in the plane direction of the back plane 10 (i.e. slot arrangement direction or sidewall direction of the back plane). These first housing component 3 and second housing component 4 can function as a housing component for the first time when they are combined together. Such a constitution simplifies a process of implementing the optical ferrule 16 and optical fibers 14 in the optical connector housing and allows installation of the optical connector on the back plane 10 in a smaller space. Further, the first housing component 3 and the second housing component 4 may be integrally molded from a resin or the like. On the tops of sides of the housing components 3 and 4, projections 31 and 32 for guiding or locking a corresponding connector (not shown) may be formed. Particularly, when the housing components 3 and 4 are integrally molded, there is no need to provide these projections 31 and 32 as separate components advantageously.

To the first housing component 3, two fixing pins 6 are fixed by press fitting or other method. These fixing pins 6 are fixed such that they protrude vertically from the bottom face of the first housing component 3. The fixing pins can be fixed to a fixing back panel 8. The inside of the fixing pins 6 is female-treaded. The fixing back panel 8 has two threaded holes 9 at positions corresponding to the fixing pins 6. The first housing component 3 is placed upright on the back plane 10 detachably, by use of these fixing pins 6 and fixing back panel 8, with the back plane 10 sandwiched between the fixing surface of the first housing component 3 and the fixing back panel 8 and with the fixing pins 6 through the back plane 10.

The optical ferrule 16 which is used in the present invention may be a conventionally used optical ferrule. For example, it may be one having 8 cores as shown in the drawings or may be one having multiple cores or a single core depending on usages. The optical ferrule 16 is attached to one ends of the optical fibers 14. The optical fibers 14 may be fixed to a fiber board 12 which bundles them. In the present specification, the optical fibers 14, the fiber board 12 and members that function in the same manner as optical fibers are collectively referred to as optical fiber members for the sake of convenience. Of the optical fiber members, the fiber board 12 is fixed to the back plane 10, and portions of the optical fibers 14 are laid along the top surface of the back plane 10. Fixation of the fiber board 12 to the back plate 10 can be conducted separately from, e.g. along with, placement of the optical connector housing on the back plane 10. By carrying out these operations separately, higher density of optical wiring and a smaller board pitch can be achieved easily.

In fixing the fiber board 12 to the back plane 10, the fiber board 12, the optical ferrule 16 and the optical fibers 14 which connect them are handled integrally, remaining connected to each other. Particularly, sufficient care must be taken in handling the optical fibers 14 in the fixing operation so as to avoid breaking of the fibers 14, since strength is not secured in portions of the optical fibers 14 where the fibers 14 contact the fiber board 12. However, it can be said that a possibility of the occurrence of fiber breaking in the fixing operation in the present invention is very low as compared with the prior art where the fixing operation is carried out with the optical connector housing attached.

The optical ferrule 16 and portions of the optical fibers 14 connected to the ferrule 16, particularly portions thereof bent at nearly right angle to the first housing component 3, are housed in a housing space of the first housing component 3, being sandwiched between the component 3 and the second housing component 4. In the first housing component 3, the housing space 5 which is hollowed according to the shapes of these components to be housed is formed. The housing space 5 is accessible through an opening 7 which is formed on a side wall of the first housing component 3. The optical ferrule 16 which is attached to one ends of the optical fibers 14 and portions of the optical fibers 14 which are bent at nearly right angle to the back plane 10 can be housed in the housing space 5 by causing the portions of the fibers 14 together with the optical ferrule 16 to move in parallel to the back plane 10 through the opening 7.

After the predetermined components are housed in the housing space 5, the second housing component 4 is brought close to the first housing component 3 from above the back plane 10, e.g. from a nearly perpendicular direction to the back plane 10, as indicated by the arrow B (refer to FIG. 5), and fixed to the first housing component 3. Thereby, the opening 7 of the housing space 5 can be closed with the optical ferrule 16 and the bent portions of the optical fibers 14 housed in the housing space 5.

As a method of fixing the second housing component 4 to the first housing component 3, it is conceivable to fix the members to each other by use of screws with the opening 7 of the housing space 5 closed from the side of the first housing component 3. As another example, use of slide press fitting is conceivable. To carry out the slide press fitting, concave slide portions 34 and convex slide portions 35 are formed in the slide direction on the second housing component 4 and the first housing component 3, respectively. Use of the slide method obviates use of screws and comparable parts and allows the first housing component 3 and the second housing component 4 to fit each other without stressing the optical fibers 14. Further, as the final stage of the slide press fitting, the second housing component 4 may be fixed to the first housing component 3 more securely by fitting a press-fitting convex portion 36 that is formed in the central portion of the bottom of the second housing component 4 into press-fitting concave portions 37 that are formed in the central portion of the bottom side of the first housing component 3.

Although not particularly shown in the drawings, when a plurality of optical connectors are installed on the optical plane 10, all first housing components 3 are fixed on the back plane 10, all corresponding fiber boards 12 are placed at predetermined positions on the back plane 10, the optical ferrules 16 and optical fibers 14 that are attached to the fiber boards 12 are then housed in the housing spaces 5 of the first housing components 3, and the second housing components 4 are attached. Such an installation method obviates need for a significant change in the positions of the fiber boards 12 that are already placed on the back plane 10.

According to the present invention described above, the optical connector can be installed by a process of fixing the connector housing on the back plane 10 in advance and placing the optical fibers 14 and the fiber board 12 on the back plane 10. Therefore, the process is simplified as compared with a process of attaching the optical fibers 14 and the fiber board 12 to the connector housing first and then mounting the connector housing on the back plane 10, and higher density of the optical fibers 14 can be achieved easily. Further, since the bending radius of the optical fibers 14 in the vicinity of the fiber slot 11 can be made smaller (i.e. the length thereof can be made shorter) by use of conventionally used highly flexible fibers, the height of the optical connector can be lowered, and a decrease in space can also be achieved. In particular, according to the constitution of the present invention, mounting of the optical fibers 14 requires merely a small extra length as compared with the prior art described with reference to FIG. 18, and a connector adapted to the shortest length can be designed.

Figure 6:
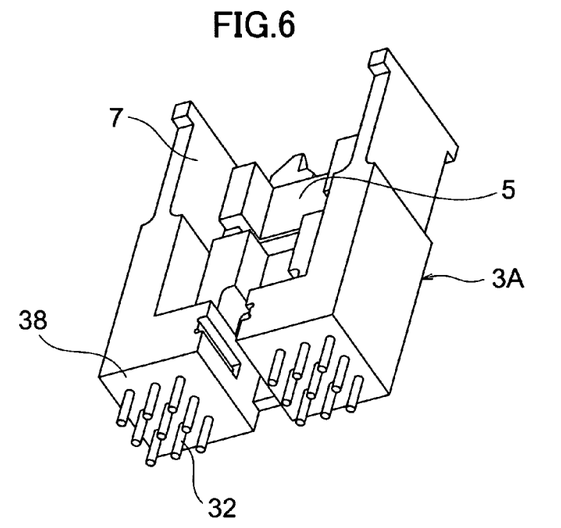
FIG. 6 is a diagram showing a variation example of the first housing component using press-fit terminals.

FIG. 6 shows a variation example of the first housing component. A first housing component 3A according to the variation example uses press-fit terminals 32 provided on the fixing surface 38 that contacts the back plane 10 so as to be fixed to the back plane, in place of the fixing pins 6 and the fixing back panel 8 shown in FIG. 3. A number of press-fit terminals 32 protrude from the fixing surface 38. FIG. 6 illustrates the first housing component 3A as viewed perspectively from the fixing surface side for a clear view of these press-fit terminals 32.

The press-fit terminals 32 are commonly used in the field of electric connectors and well known to those skilled in the art. These press-fit terminals 32 generally have an electric signal transferring function. However, since the primary object of the press-fit terminals 32 used in the present invention is to position the first housing component 3A on the back plane 10, it does not matter whether the press-fit terminals 32 in the present invention have such an electric signal transferring function. However, use of this variation example has an advantage that as in the case of an electric connector which is mounted on the back plane 10 by use of the press-fit terminals 32, the optical connector of the present invention can also be mounted on the back plane 10 by use of the press-fit terminals 32, so that all connector components can be fixed by the same fixation method. Thereby, the manufacturing process of an electro-optic composite back plane 10 can also be simplified.

Figures 7A, 7B:
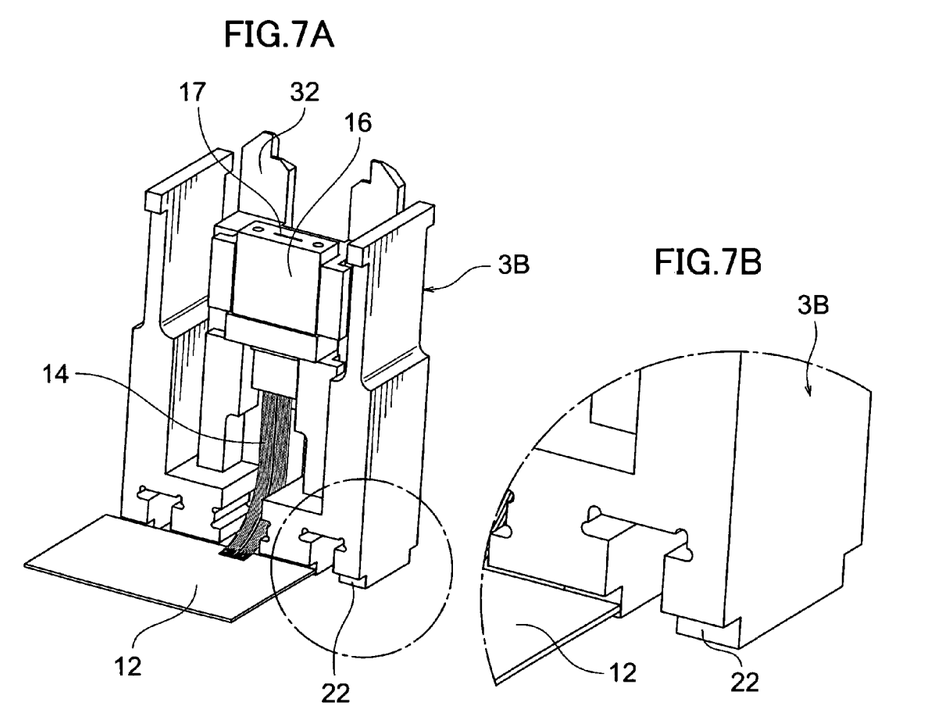
FIG. 7 is a diagram showing a variation example of the first housing component having an hollowed edge.

FIG. 7 shows another variation example of the first housing component. FIG. 7(a) is an overall view of a first housing component 3B according to this variation example with an optical fiber member, and FIG. 7(b) is an enlarged view of a portion thereof. In this variation example, in the first housing component 3B, an edge 22 of the fixing surface which contacts the back plane 10 is hollowed on the side where the opening 7 is formed, whereby the fiber board 12 can be placed more closely to the first housing component 3B when the fiber board 12 is fixed to the back plane 10. Further, according to this constitution, exposed portions of the optical fibers 14 from the fiber board 12 can be made smaller.

In general, when high-density optical wiring is implemented with small package board pitches, the width of the fiber board 12 may become larger than the spacing between connectors in some cases. As in this variation example, when one side of the bottom of the first housing component 3B to be fixed to the back plane 10 is made more retracted than other sides of the first housing component 3B, an edge of the fiber board 12 can be made closer to the housing space 5 side of the first housing component 3B. Thus, according to this constitution, the extra length of the optical fibers 14 to be placed on the back plane 10 can be made shorter, and higher density wiring than that achieved by the constitution of the above first embodiment can be achieved.

Figure 8:
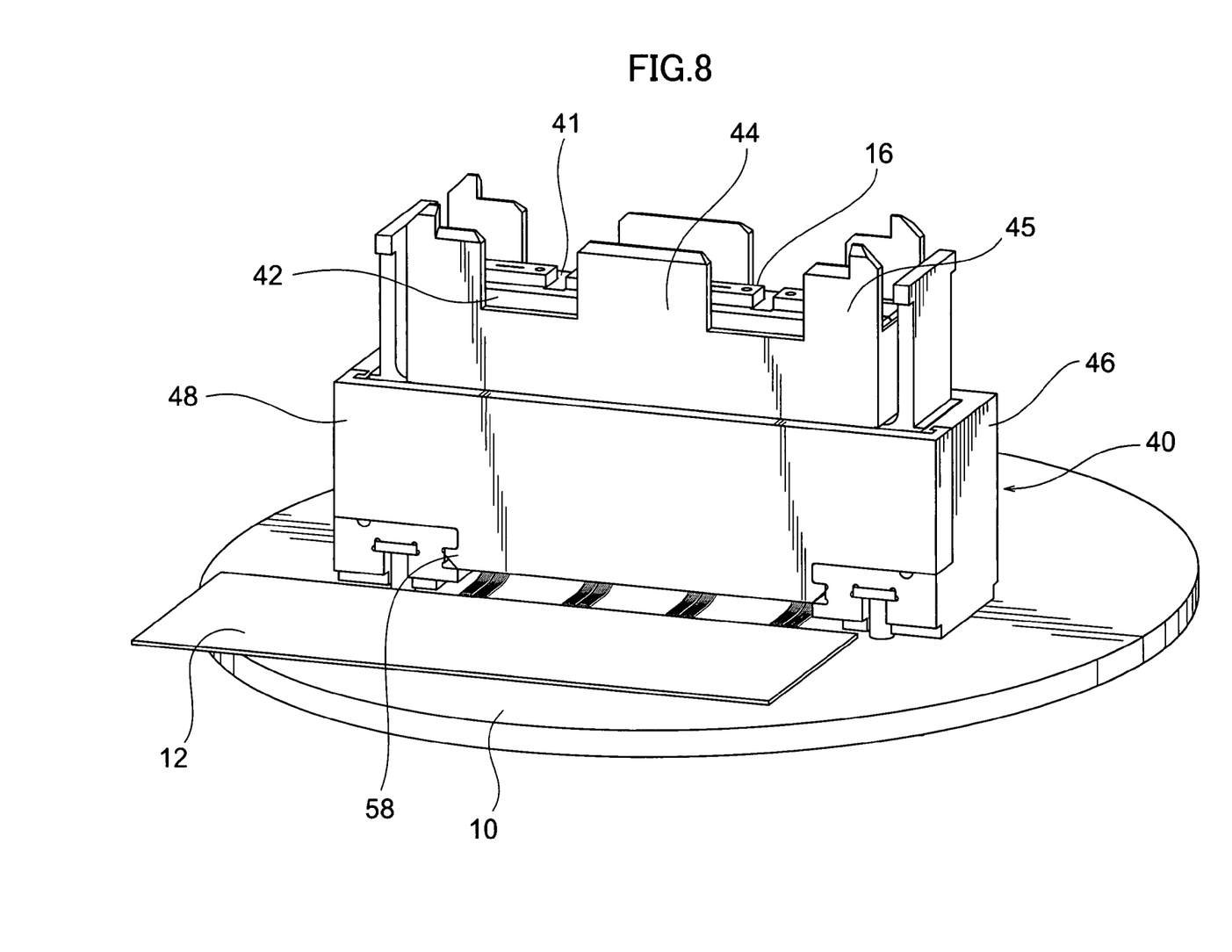
FIG. 8 is a perspective view of the final assembled form of a board-mounted optical connector according to a second embodiment of the present invention.

FIGS. 8 to 17 show a second embodiment of the present invention. FIG. 8 is a perspective view of the final assembled form of a board-mounted optical connector according to the second embodiment. FIGS. 9 to 13 are perspective views of main components of an optical connector housing before mounted on the back plane 10 and before incorporating the optical ferrule 16. FIGS. 14 to 17 are diagrams illustrating steps of assembling the main components shown in FIGS. 9 to 13 into the final form shown in FIG. 8.

Figure 9:
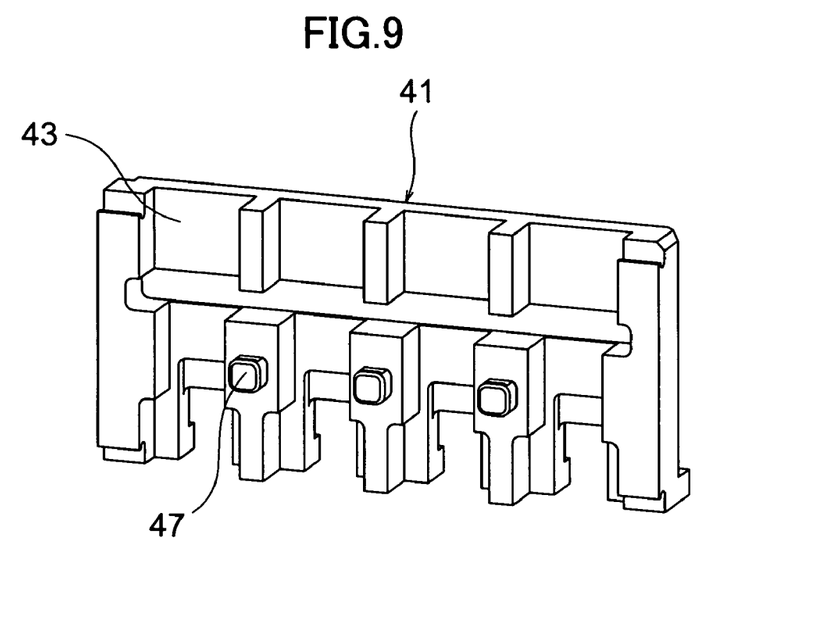
FIG. 9 is a perspective view of a first ferrule holding component of an optical connector housing.
Figure 10:
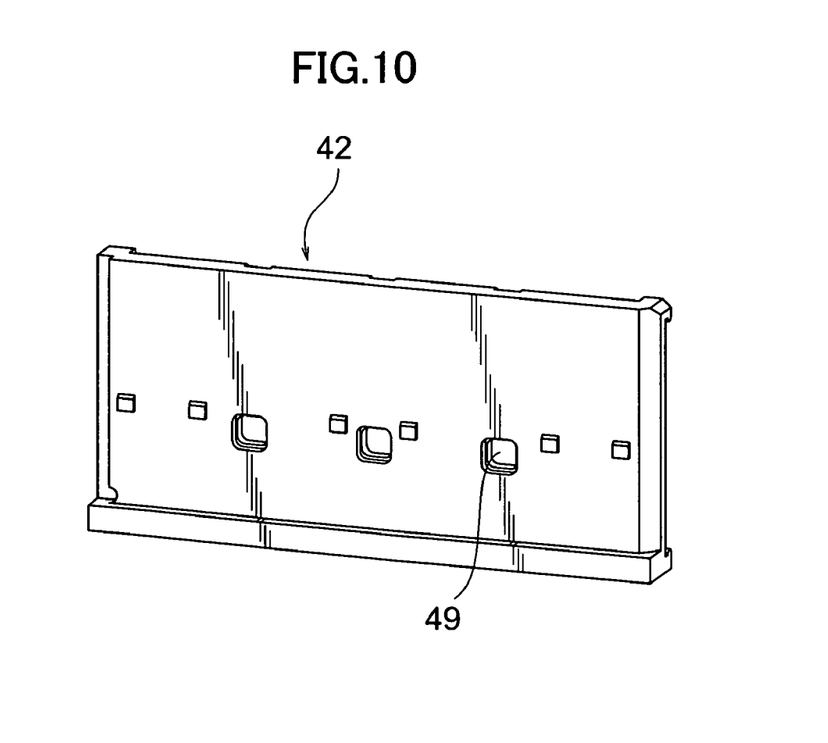
FIG. 10 is a perspective view of a second ferrule holding component of the optical connector housing.
Figure 11:
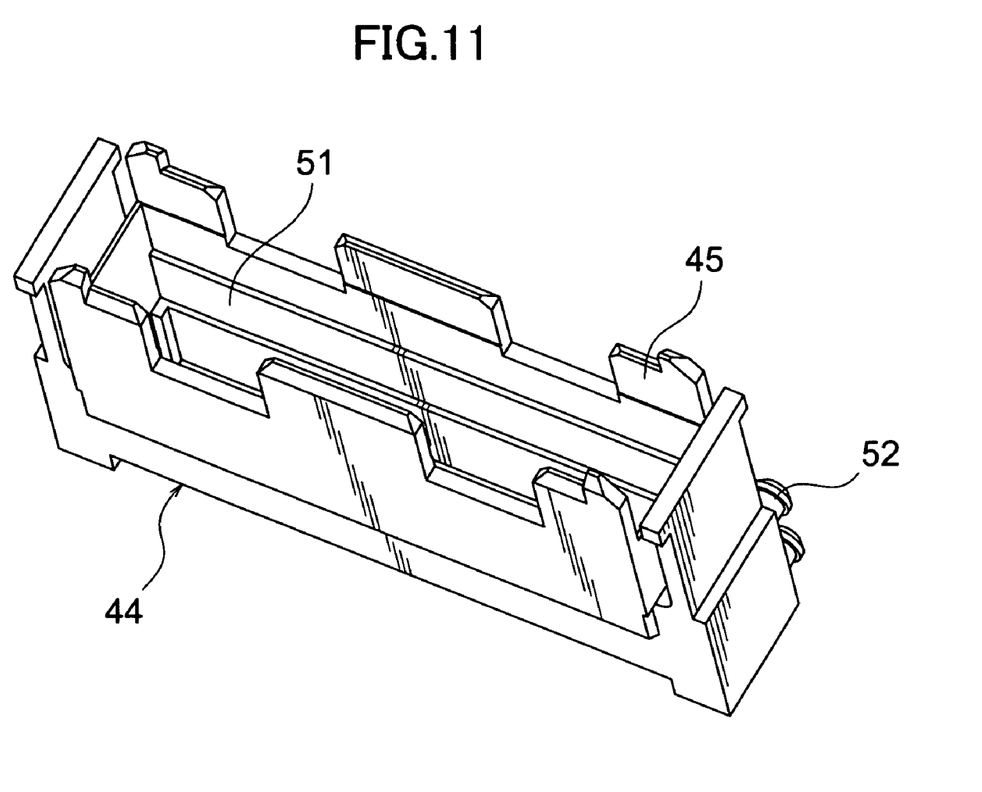
FIG. 11 is a perspective view of an auxiliary housing of the optical connector housing.
Figure 12:
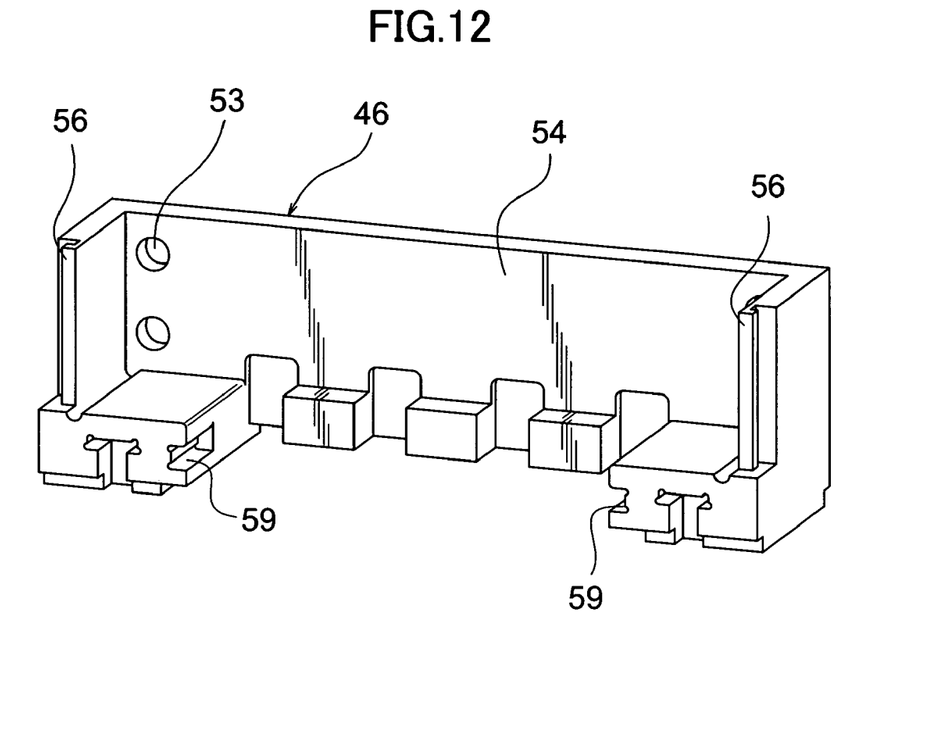
FIG. 12 is a perspective view of a first housing fixing component of the optical connector housing.
Figure 13:
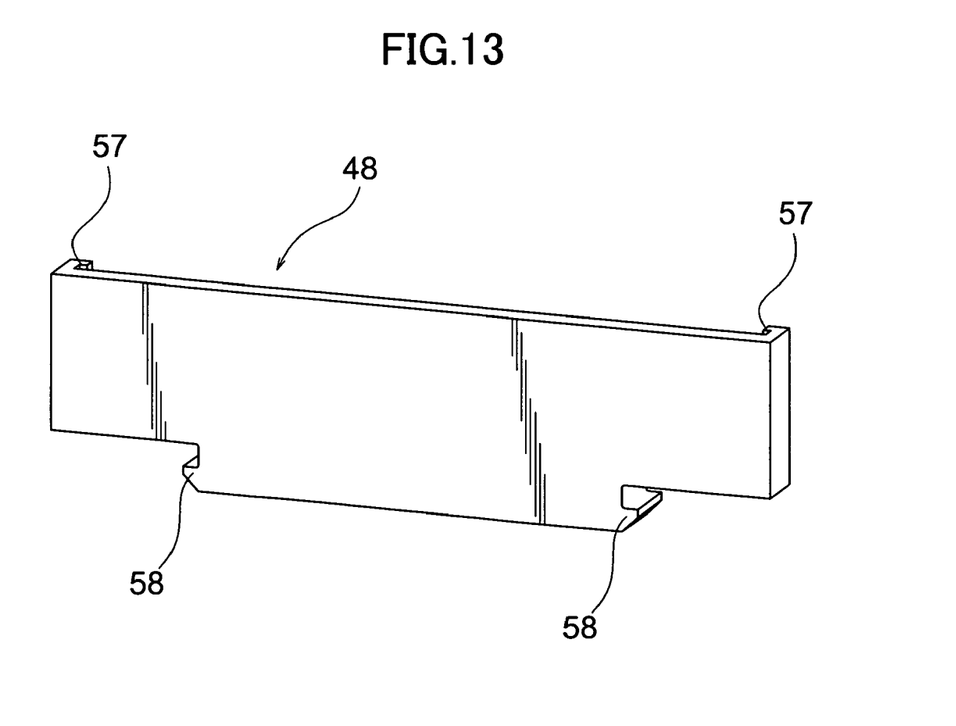
FIG. 13 is a perspective view of a second housing fixing component of the optical connector housing.

The main components of the optical connector housing include a first ferrule holding component 41 shown in FIG. 9, a second ferrule holding component 42 shown in FIG. 10, an auxiliary housing 44 shown in FIG. 11, a first housing fixing component 46 shown in FIG. 12, and a second housing fixing component 48 shown in FIG. 13.

Unlike the optical connector 1 for a single optical ferrule as in the first embodiment, an optical connector 40 according to the second embodiment is an optical connector for a plurality of optical ferrules (which is presented herein as an optical connector capable of incorporating four optical ferrules 16), and a plurality of optical ferrules 16 can be arranged therein, whereby higher density wiring than that achieved by the constitution of the first embodiment can be achieved. Further, this optical connector 40 has the first ferrule holding component 41 and the second ferrule holding component 42 for holding a plurality of optical ferrules 16.

Further, unlike the optical connector 1 according to the first embodiment, the components which house the optical ferrules 16, i.e. the first ferrule holding component 41 and the second ferrule holding component 42, in the optical connector 40 according to the second embodiment do not have guiding portions. Instead, such guiding portions 45 are provided on the cylindrical auxiliary housing 44 which surrounds these ferrule holding components 41 and 42 from outside to keep them together. That is, in this second embodiment, the components 41 and 42 which house the optical ferrules 16 are independent of the component 44 which has the guiding portions. By this constitution, in this second embodiment, the housing can be made stronger than the constitution of the first embodiment.

The first ferrule holding component 41 shown in FIG. 9 and the second ferrule holding component 42 shown in FIG. 10 are used in pairs. At the corresponding positions of these first ferrule holding component 41 and second ferrule holding component 42, four concave holding portions 43 for holding the optical ferrules 14 are formed. By joining these holding portions 43 with the optical ferrules 16 placed therein, a plurality of (i.e. four) optical ferrules 16 can be held between the holding portions 43. As guides for joining these first ferrule holding component 41 and second ferrule holding component 42, three positioning projections 47 are formed on the first ferrule holding component 41, and three positioning holes 49 are provided on the second ferrule holding component 42.

The auxiliary housing 44 shown in FIG. 11 is integrally molded so as to form a nearly rectangular cylindrical form as a whole and has the guiding portions 45 provided at the top. The auxiliary housing 44 covers the side faces of the first ferrule holding component 41 and second ferrule holding component 42 joined together. After joined and fitted to each other, the first ferrule holding component 41 and the second ferrule holding component 42 can be fitted into a cylindrical hole 51 of the auxiliary housing 44 by such a method as press fitting and fixed therein.

As in the case of the first housing component 3 and the second housing component 4 in the first embodiment, the first housing fixing component 46 shown in FIG. 12 and the second housing fixing component 48 shown in FIG. 13 are constituted as components separable from each other. More specifically, the second housing fixing component 48 is formed separately from the first housing fixing component 46 in the plane direction of the back plane 10. These first housing fixing component 46 and second housing fixing component 48 can function as a housing fixing component for the first time when they are combined together. Such a constitution simplifies a process of implementing the optical ferrule 16 in the optical connector housing and allows installation of the optical connector in a smaller space.

In the first housing fixing component 46 shown in FIG. 12, the auxiliary housing 44 which fixes the first ferrule holding component 41 and the second ferrule holding component 42 therein is placed with its nearly upper half exposed. The auxiliary housing 44 can be moved along the plane direction of the back plane 10 and placed in a housing space 54 of the first housing fixing component 46. To prevent the auxiliary housing 44 from coming off from the first housing fixing component 46 after the housing 44 is placed in the component 46, two pairs, i.e. four in total, of stick-shaped projections 52 which are provided on both sides of a side face of the auxiliary housing 44 are inserted into two pairs, i.e. four in total, of corresponding holes 53 which are provided on both sides of a side face of a side wall of the first housing fixing component 46.

After the auxiliary housing 44 is placed in the housing space 54, the second housing fixing component 48 is brought close to the first housing fixing component 46 from above the component 46 and fixed to the first housing fixing component 46 by such a method as slide press fitting. To carry out the slide press fitting, convex slide portions 56 and concave slide portions 57 are formed along the slide direction on the first housing fixing component 46 and the second housing fixing component 48, respectively. As the final stage of the slide press fitting, the second housing fixing component 48 may be fixed to the first housing fixing component 46 more securely by fitting press-fitting convex portions 58 that are formed in the central portion of the bottom of the second housing fixing component 48 into press-fitting concave portions 59 that are formed in the central portion of the bottom side of the first housing fixing component 46.

Figure 14:
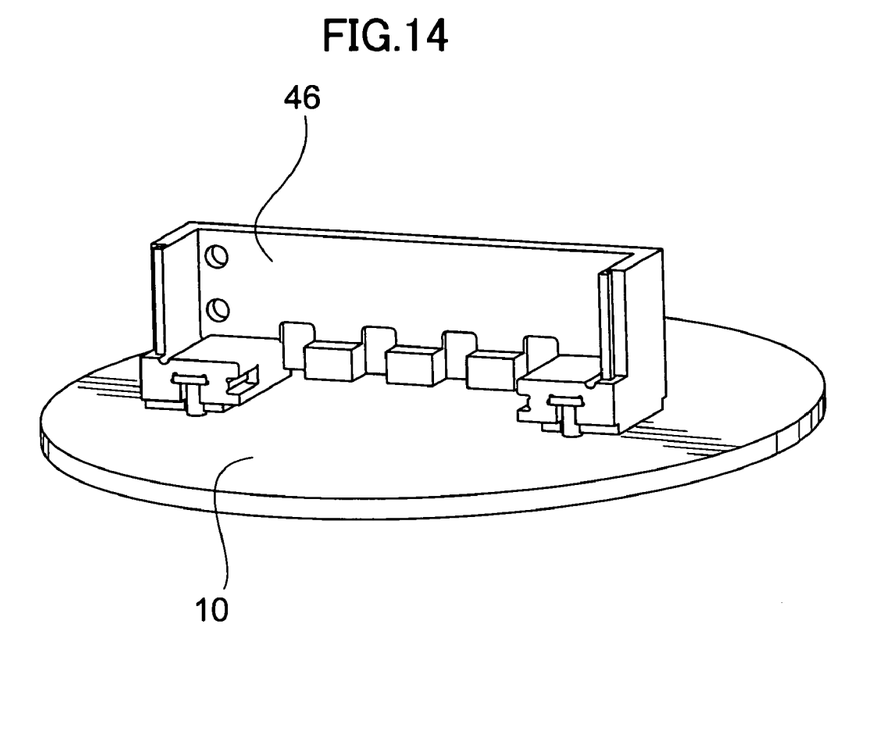
FIG. 14 is a diagram illustrating one step in the assembling procedure of the optical connector of the present invention.
Figure 15:
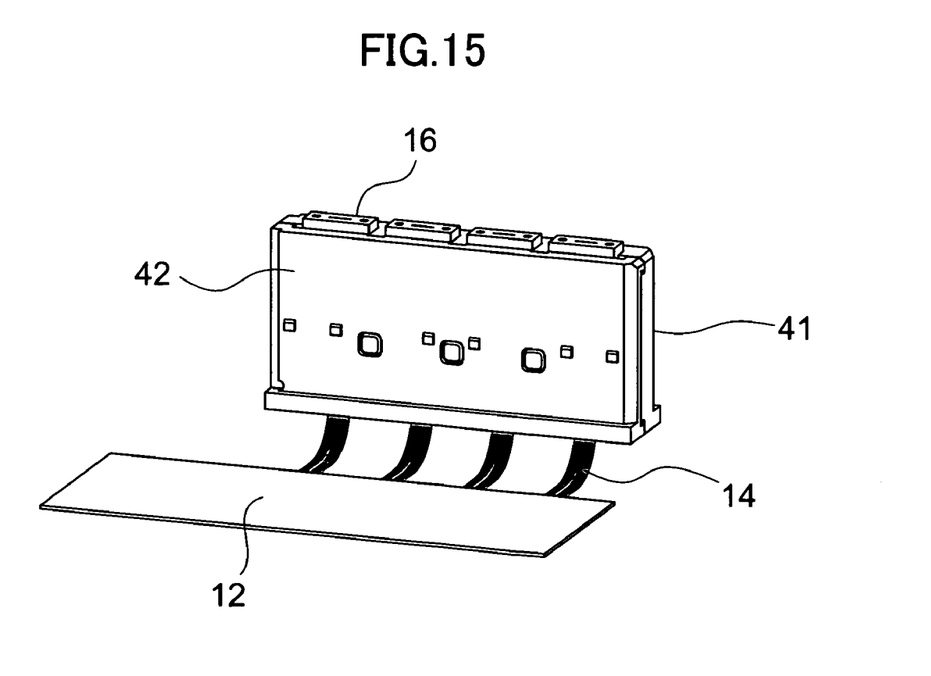
FIG. 15 is a diagram illustrating one step in the assembling procedure of the optical connector of the present invention.
Figure 16:
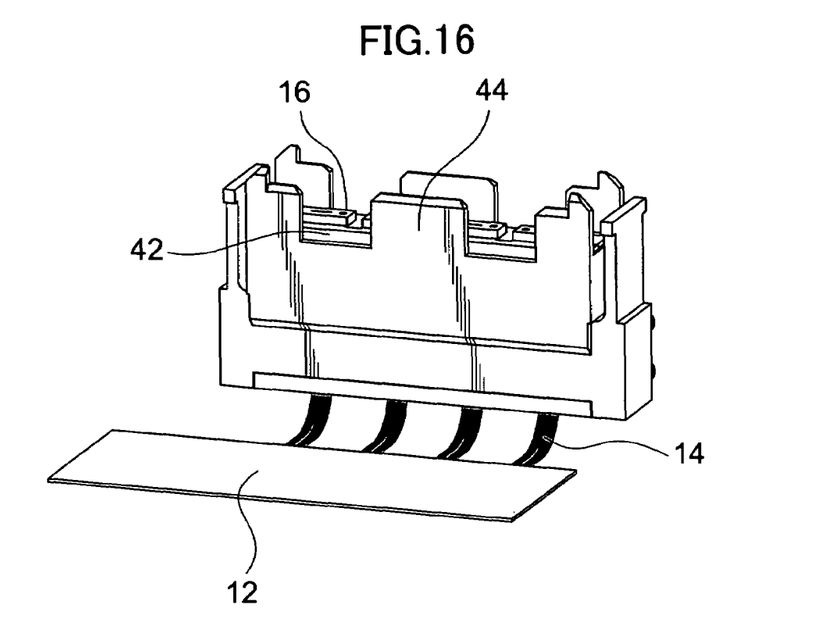
FIG. 16 is a diagram illustrating one step in the assembling procedure of the optical connector of the present invention.
Figure 17:
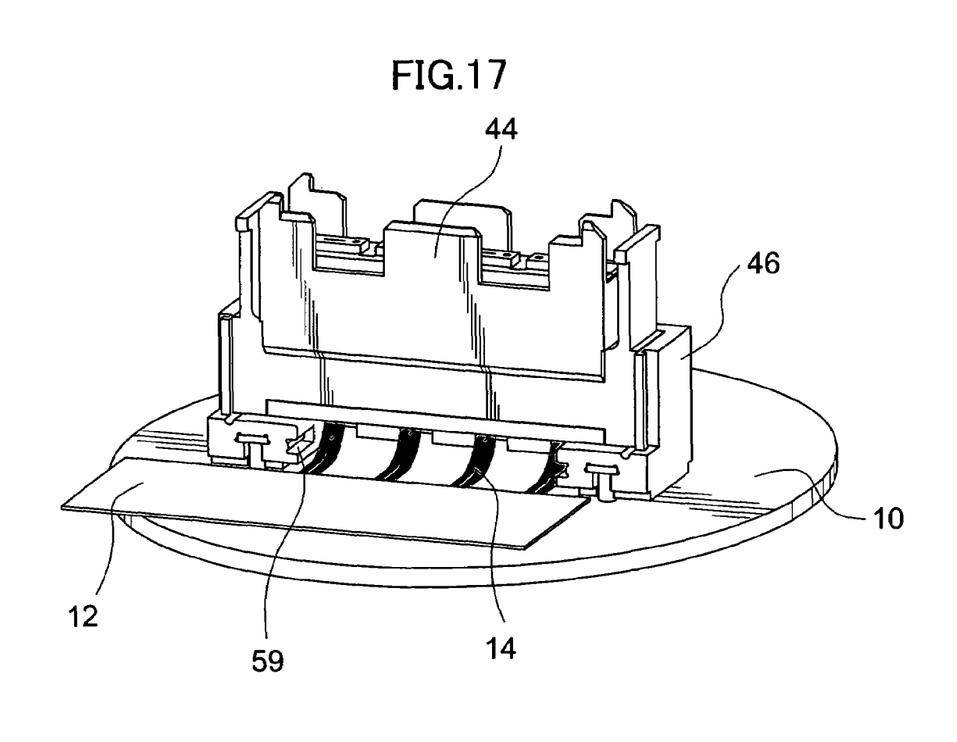
FIG. 17 is a diagram illustrating one step in the assembling procedure of the optical connector of the present invention.

Finally, the assembling procedure of the optical connector of the present invention will be described with reference to FIG. 8 and FIGS. 14 to 17. Firstly, as shown in FIG. 14, all the required first housing fixing component 46 is mounted on the back plane 10. Along with this, a plurality of optical ferrules 16 coming out of the fiber board 12 are sandwiched between the first ferrule holding component 41 and the second ferrule holding component 42 as shown in FIG. 15, the auxiliary housing 44 is fitted around the components 41 and 42 from above as shown in FIG. 16, and these components are then positioned at a predetermined position on the back plane 10 as shown in FIG. 17. At that time, since the first housing fixing component 46 is already placed at an appropriate position on the back plane 10, the member shown in FIG. 15 can be placed in the first housing fixing component 46 shown in FIG. 14 without making a significant position change later. Finally, the second housing fixing component 48 is fixed to the first housing fixing component 46 by slide press fitting, and the press-fitting convex portions 58 of the second housing fixing component 48 are fitted into the press-fitting concave portions 59 of the first housing fixing component 46, thereby completing assembling of the optical connector. According to the constitution of the second embodiment, in particular, a connector that can be assembled on a board, has components subjected to stress upon detachment and attachment of the connector integrated and has excellent durability can be achieved.

The present invention is applicable not only to optical connectors but also to various connectors such as electric connectors and board-mounted connectors.

What is claimed is:

1. A board-mounted optical connector to be fitted with a corresponding optical connector in a direction substantially perpendicular to the top surface of a board on which the board-mounted optical connector is mounted, the board-mounted optical connector having a housing comprising:
   a first housing component; and
   a second housing component;
   wherein
   the first housing component has a housing space accessible through an opening formed in at least a portion of a side wall of the first housing component and houses portions of optical fiber members that are partially laid along the top surface of the board and are bent at nearly a right angle to the board together with an optical component connected to the optical fiber members in the housing space through the opening, the opening being configured so that the optical component and the portions of the optical fiber members are accessible from a direction substantially parallel to the top surface of the board, and
   the second housing component is attached to the first housing component in the direction substantially perpendicular to the top surface of the board and can close the opening of the housing space with the portions of the optical fiber members and the optical component connected to the optical fiber members housed in the first housing component.

2. The optical connector of claim 1, wherein the first housing component and the second housing component each are integrally molded and have portions for guiding or locking a corresponding connector to be fitted to the optical connector.

3. The optical connector of claim 2, wherein the second housing component is fixed to the first housing component by press fitting.

4. The optical connector of claim 3, wherein the first housing component has press-fit terminals on the fixing surface which contacts the board.

5. The optical connector of claim 4, wherein in the first housing component, an edge of the fixing surface which contacts the board is hollowed on the side where the opening is formed.

6. The optical connector of claim 1, wherein the second housing component is fixed to the first housing component by press fitting.

7. The optical connector of claim 6, wherein the first housing component has press-fit terminals on the fixing surface which contacts the board.

8. The optical connector of claim 7, wherein in the first housing component, an edge of the fixing surface which contacts the board is hollowed on the side where the opening is formed.

9. The optical connector of claim 6, wherein in the first housing component, an edge of the fixing surface which contacts the board is hollowed on the side where the opening is formed.

10. The optical connector of claim 1, wherein the first housing component has press-fit terminals on the fixing surface which contacts the board.

11. The optical connector of claim 10, wherein in the first housing component, an edge of the fixing surface which contacts the board is hollowed on the side where the opening is formed.

12. The optical connector of claim 1, wherein in the first housing component, an edge of the fixing surface which contacts the board is hollowed on the side where the opening is formed.

13. The optical connector of claim 1, wherein convex slide portions and concave slide portions are formed in the direction substantially perpendicular to the top surface of the board on the respective first housing component and the second housing component.

14. A board-mounted optical connector to be fitted with a corresponding optical connector in a direction substantially perpendicular to the top surface of a board on which the board-mounted optical connector is mounted, the board-mounted optical connector having a housing comprising:
   holding components;
   a first housing component; and
   a second housing component;
   wherein
   the holding components hold a plurality of optical components each connected to one ends of optical fiber members,
   the first housing component has a housing space accessible through an opening formed in a side wall of the first housing component and houses portions of the optical fiber members that are partially laid along the top surface of the board and are bent at nearly a right angle to the board together with the holding components connected to the optical fiber members in the housing space through the opening, the opening being configured so that the optical component and the portions of the optical fiber members are accessible from a direction substantially parallel to the top surface of the board, and
   the second housing component is attached to the first housing component from above the board in the direction substantially perpendicular to the top surface of the board and can close the opening of the housing space with the portions of the optical fiber members and the optical components connected to the optical fiber members housed in the first housing component.

15. The optical connector of claim 14, wherein an auxiliary housing having portions for guiding or locking a corresponding connector to be fitted to the optical connector is attached to the holding components.

16. The optical connector of claim 15, wherein the second housing component is fixed to the first housing component by press fitting.

17. The optical connector of claim 16, wherein the first housing component has press-fit terminals on the fixing surface which contacts the board.

18. The optical connector of claim 17, wherein in the first housing component, an edge of the fixing surface which contacts the board is hollowed on the side where the opening is formed.

19. The optical connector of claim 14, wherein the second housing component is fixed to the first housing component by press fitting.

20. The optical connector of claim 19, wherein the first housing component has press-fit terminals on the fixing surface which contacts the board.

21. The optical connector of claim 20, wherein in the first housing component, an edge of the fixing surface which contacts the board is hollowed on the side where the opening is formed.

22. The optical connector of claim 19, wherein in the first housing component, an edge of the fixing surface which contacts the board is hollowed on the side where the opening is formed.

23. The optical connector of claim 14, wherein the first housing component has press-fit terminals on the fixing surface which contacts the board.

24. The optical connector of claim 23, wherein in the first housing component, an edge of the fixing surface which contacts the board is hollowed on the side where the opening is formed.

25. The optical connector of claim 14, wherein in the first housing component, an edge of the fixing surface which contacts the board is hollowed on the side where the opening is formed.

26. The optical connector of claim 14, wherein convex slide portions and concave slide portions are formed in the direction substantially perpendicular to the top surface of the board on the respective first housing component and the second housing component.

* * * * *